(12) United States Patent
Uchida et al.

(10) Patent No.: US 8,861,490 B2
(45) Date of Patent: Oct. 14, 2014

(54) TRANSMISSION DEVICE, TRANSMISSION METHOD, AND COMPUTER-READABLE MEDIUM

(75) Inventors: Shigenori Uchida, Kanagawa (JP); Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 1371 days.

(21) Appl. No.: 12/135,181

(22) Filed: Jun. 8, 2008

(65) Prior Publication Data

US 2009/0010241 A1 Jan. 8, 2009

(30) Foreign Application Priority Data

Jun. 7, 2007 (JP) ................................ P2007-151185

(51) Int. Cl.
*H04J 3/24* (2006.01)
*H04W 28/22* (2009.01)
*H04W 72/12* (2009.01)

(52) U.S. Cl.
CPC .............. *H04W 28/22* (2013.01); *H04W 72/12* (2013.01)
USPC ............................. 370/338; 370/345; 370/335

(58) Field of Classification Search
USPC .................. 370/345, 335, 338, 352, 354, 401
See application file for complete search history.

(56) References Cited

U.S. PATENT DOCUMENTS

| | | | | |
|---|---|---|---|---|
| 5,602,829 | A * | 2/1997 | Nie et al. | 370/235 |
| 6,067,458 | A * | 5/2000 | Chen | 455/522 |
| 7,072,682 | B2 * | 7/2006 | Uehara et al. | 455/525 |
| 7,437,654 | B2 * | 10/2008 | Das et al. | 714/790 |
| 7,454,222 | B2 * | 11/2008 | Huang et al. | 455/522 |
| 8,059,607 | B1 * | 11/2011 | Shaw et al. | 370/334 |
| 2004/0017790 | A1 * | 1/2004 | del Prado et al. | 370/333 |
| 2004/0165575 | A1 * | 8/2004 | Yang et al. | 370/349 |
| 2004/0187125 | A1 * | 9/2004 | Ko | 718/100 |
| 2004/0203383 | A1 * | 10/2004 | Kelton et al. | 455/41.2 |
| 2004/0246935 | A1 * | 12/2004 | Joshi et al. | 370/338 |
| 2005/0195776 | A1 * | 9/2005 | Xu | 370/338 |
| 2005/0229139 | A1 * | 10/2005 | Tsai et al. | 716/17 |
| 2006/0209937 | A1 * | 9/2006 | Tanaka et al. | 375/219 |
| 2007/0110091 | A1 * | 5/2007 | Kwon | 370/445 |
| 2008/0002615 | A1 * | 1/2008 | Nakajima et al. | 370/328 |

FOREIGN PATENT DOCUMENTS

| | | |
|---|---|---|
| JP | 2000-151639 | 5/2000 |
| JP | 2006-352844 | 12/2006 |
| WO | WO 2007/058492 A1 | 5/2007 |

OTHER PUBLICATIONS

Notification of Reasons for Refusal, issued Jan. 17, 2012 with English language translation from the Japanese Patent Office in corresponding Japanese Patent application No. 2007-151185.

* cited by examiner

*Primary Examiner* — Rasheed Gidado
(74) *Attorney, Agent, or Firm* — Sherr & Jiang, PLLC

(57) ABSTRACT

A transmission device transmits data to a certain communication device among multiple communication devices connected over a wireless network in wireless communication capable of using multiple transmission rates. The transmission device includes first transmitting means for transmitting a first packet to the certain communication device during a transmission inhibited period; receiving means for receiving a second packet including information indicating a communication environment at reception of the first packet at the certain communication device from the certain communication device; and second transmitting means for transmitting a third packet to the certain communication device at a transmission rate appropriate for the information that is included in the received second packet and that indicates the communication environment. The data length of the certain data included in the first packet is shorter than that of the data included in the third packet.

8 Claims, 13 Drawing Sheets

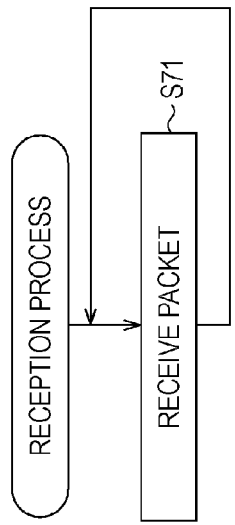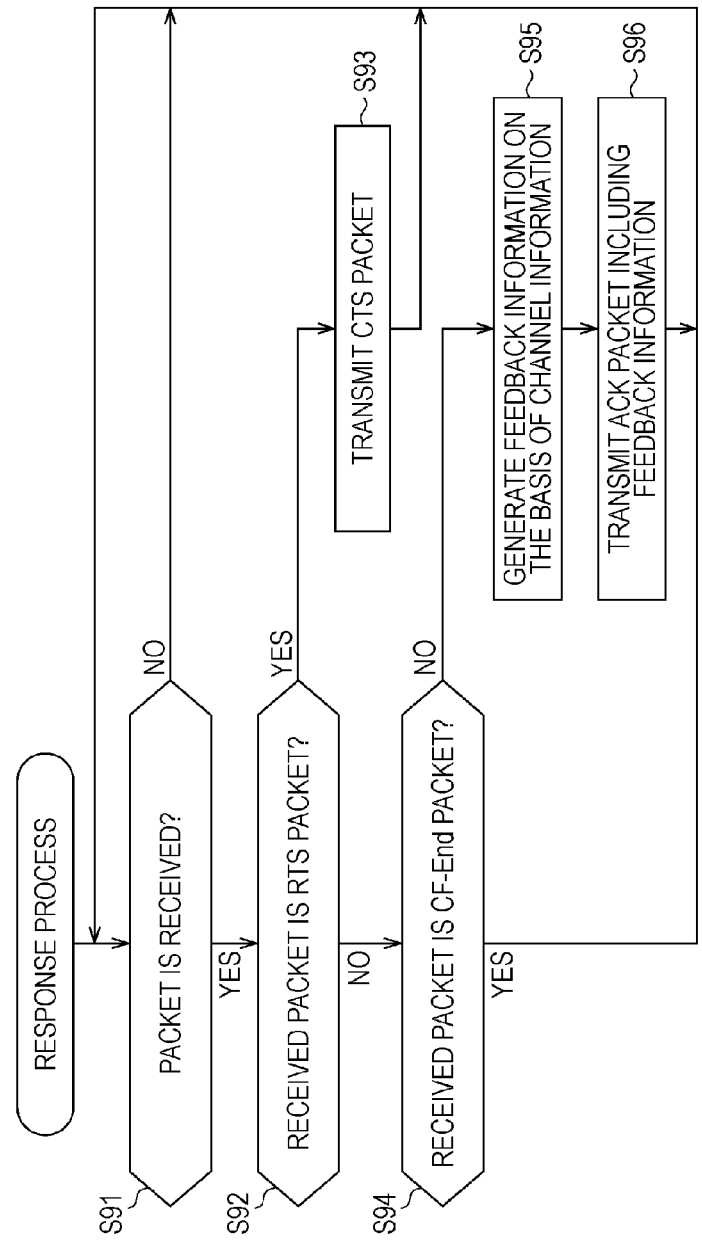

FIG. 14

| | RATE FEEDBACK WITH RTS/CTS | RATE FEEDBACK WITH QosNull/ACK |
|---|---|---|
| 1AP1STA ENVIRONMENT (STATIONARY ENVIRONMENT) | 74.5[Mbps] | 82.4[Mbps] |
| 1AP3STA ENVIRONMENT (TWO-TERMINALS MOVING ENVIRONMENT) | 32.1[Mbps] | 33.7[Mbps] |

TRANSMISSION DEVICE, TRANSMISSION METHOD, AND COMPUTER-READABLE MEDIUM

CROSS REFERENCES TO RELATED APPLICATIONS

The present invention contains subject matter related to Japanese Patent Application JP 2007-151185 filed in the Japanese Patent Office on Jun. 7, 2007, the entire contents of which are incorporated herein by reference.

BACKGROUND OF THE INVENTION

1. Field of the Invention

The present invention relates to transmission devices, transmission methods, and computer-readable media. In particular, the present invention relates to a transmission device, a transmission method, and a computer-readable medium capable of appropriate control of a transmission rate.

2. Description of the Related Art

In recent years, wireless networks, such as wireless local area networks (LANs) conforming to Institute of Electrical and Electronic Engineers (IEEE) 802.11, come into wide use instead of wired networks because the wireless networks have the advantages of, for example, higher flexibility in sites where devices are installed. As the result of various applications that process a large amount of data, such as images, and that frequently access the networks, higher transmission rates are required for the wireless LANS and it becomes necessary to further improve the throughputs.

In order to achieve the above object, IEEE 802.11 adopts transmission rate control in which multiple kinds of transmission rates are made available in the physical layer (PHY layer) and an optimal transmission rate is selected in accordance with a variation in the actual communication environment. Such transmission rate control is called link adaptation. For example, when the actual communication environment in a network is varied in a manner shown in FIG. 1 (refer to a dotted line in FIG. 1), the transmission rates used in the network are reset so as to agree with the actual communication environment (refer to solid lines in FIG. 1).

As a result, a higher transmission rate is selected to realize a higher throughput when the reception state is good whereas a lower transmission rate (that is, a transmission rate having a higher error resilience) is selected to improve the accessibility of transmission data and to improve the throughput (increase the amount of transmitted information) per unit time when the reception state is not good. The transmission rate is realized by a combination of the modulation method corresponding to the transmission rate, the redundancy, and so on. In Multiple Input Multiple Output (MIMO) communication systems conforming to, for example, Enhanced Wireless Consortium (EWC) or Worldwide Interoperability for Microwave Access (WiMAX), the numbers of antennas are also considered.

In a typical link adaptation in related art, a terminal at the reception side (hereinafter referred to as a responder) feeds back information (hereinafter referred to as feedback information) indicating the reception state of a signal received from a terminal at the transmission side (hereinafter referred to as an initiator) to the initiator, and the initiator resets the transmission rate on the basis of the feedback information to transmit next data. Such a method is called rate feedback. This method utilizes the characteristic in which the communication environment at the reception time at the responder is similar to that at the transmission time at the initiator when the reception time is close to the transmission time.

For example, in a system disclosed in Japanese Unexamined Patent Application Publication No. 2000-151639, a responder measures the communication environment of the own device on the basis of, for example, a received signal strength indicator (RSSI), upon reception of a Request to Send (RTS) packet transmitted from an initiator, adds the transmission rate corresponding to the measurement result to a Clear to Send (CTS) packet as feedback information, and returns the transmission rate added to the CTS packet to the initiator. The initiator sets the transmission rate on the basis of the feedback information described in the CTS packet returned from the responder.

In the network system, as shown in FIG. 2, a transmission inhibited period (the period of a Network Allocation Vector (NAV)) is set on the basis of information described in the Duration field of the RTS packet or the CTS packet. The transmission inhibited period is shaded in FIG. 2. During the transmission inhibited period, data transmission by a third-party terminal is inhibited and a DATA packet for transmitting data and an acknowledgement (ACK) packet for responding to the DATA packet are exchanged only between the initiator and the responder. Such a configuration can prevent collision between the DATA packet transmitted from the initiator and a packet transmitted from the third-party terminal.

SUMMARY OF THE INVENTION

Since the transmission inhibited period is set after the RTS packet is transmitted in the above network system in the related art, the RTS packet itself can collide against a packet transmitted from the third-party terminal (contention). Accordingly, the transmission rate may not be controlled appropriately and the channel may not be used effectively in the method in the related art in which the transmission rate is determined on the basis of the reception state of the RTS packet.

Specifically, as shown in FIG. 3, if an RTS packet transmitted from an initiator collides against an RTS packet transmitted from a third-party terminal, a responder receives a signal in which the signal corresponding to the RTS packet from the third-party terminal is superimposed as a noise on the signal corresponding to the RTS packet from the initiator. Accordingly, the strength of the received signal, indicating the reception state of the RTS packet, becomes lower than the originally available signal strength, thus lowering the signal quality $Q\_rts$ of the received signal.

Since the transmission rate of the next transmission is determined on the basis of the strength of the received signal, which is lowered due to the collision, and the transmission rate is fed back to the initiator as the feedback information, the DATA packet is transmitted at the transmission rate lower than the originally available transmission rate. As a result, the signal quality $Q\_data$ of the signal corresponding to the DATA packet at the reception at the responder becomes excessively high and it takes a long time to perform the transmission because the transmission rate is low although the packet error rate (PER) is reduced.

It is ensured that the RTS packet and the CTS packet are transmitted at a low transmission rate (hereinafter referred to as a basic rate) at which all the wireless communication devices (terminals) in the wireless network can receive the packets. However, since the DATA packet can be transmitted at an arbitrary rate at which the concerned wireless communication devices can transmit and receive the packet, the transmission rate of the DATA packet is generally higher than the transmission rate of the RTS packet and the CTS packet. If the DATA packet is transmitted at a transmission rate higher than that of the RTS packet and the CTS packet under this situation, any error occurs and no ACK packet is returned because the DATA packet is too aggressive in comparison with the channel characteristics although the RTS packet and the CTS packet are received. In this case, since no ACK packet is returned even if the transmission rate is to be reduced, it is not possible to acquire the feedback information, thus entering a deadlock state.

In addition, in the method in the related art, when the feedback information is stored in a certain field of the CTS packet, devices that conform to the IEEE 802.11 but do not support the method may not interpret the feedback information and, therefore, the transmission rate may not be set appropriately.

It is desirable to appropriately control the transmission rate.

According to an embodiment of the present invention, a transmission device transmits data to a certain communication device among a plurality of communication devices connected over a wireless network in wireless communication capable of using a plurality of transmission rates. Communication with a communication device that does not concern transmission and reception of the data is inhibited during a certain transmission inhibited period in the wireless communication. The transmission device includes first transmitting means for transmitting a first packet including certain data to the certain communication device during the transmission inhibited period; receiving means for receiving a second packet including information indicating a communication environment at reception of the first packet at the certain communication device from the certain communication device; and second transmitting means for transmitting a third packet including the data of a certain data length to the certain communication device at a transmission rate appropriate for the information that is included in the second packet received by the receiving means and that indicates the communication environment. The data length of the certain data included in the first packet is shorter than that of the data included in the third packet.

According to other embodiments of the present invention, a transmission method and a computer-readable medium including instructions that cause a computer to perform a transmission process in a transmission device transmitting data to a certain communication device among a plurality of communication devices connected over a wireless network in wireless communication capable of using a plurality of transmission rates, communication with a communication device that does not concern transmission and reception of the data being inhibited during a certain transmission inhibited period in the wireless communication, are provided. The method and the instructions include transmitting a first packet including certain data to the certain communication device during the transmission inhibited period; receiving a second packet including information indicating a communication environment at reception of the first packet at the certain communication device from the certain communication device; and transmitting a third packet including the data of a certain data length to the certain communication device at a transmission rate appropriate for the information that is included in the received second packet and that indicates the communication environment. The data length of the certain data included in the first packet is shorter than that of the data included in the third packet.

According to the embodiments of the present invention, the first packet including certain data is transmitted to the certain communication device during the transmission inhibited period, the second packet including the information indicating the communication environment at reception of the first packet at the certain communication device is received from the certain communication device, and the third packet including the data of a certain data length is transmitted to the certain communication device at the transmission rate appropriate for the information that is included in the received second packet and that indicates the communication environment. The data length of the certain data included in the first packet is made shorter than that of the data included in the third packet.

According to the present invention, it is possible to appropriately control the transmission rate.

BRIEF DESCRIPTION OF THE DRAWINGS

FIG. 10 is a flowchart showing an example of a reception process in the initiator;

FIG. 11 is a flowchart showing an example of a response process in the responder;

FIG. 14 is a table showing experimental results of data transmission; and

DESCRIPTION OF THE PREFERRED EMBODIMENTS

Before describing embodiments of the present invention, the correspondence between the features of the claims and the specific elements disclosed in the embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Embodiments of the present invention will herein be described with reference to the attached drawings.

Figure 1:
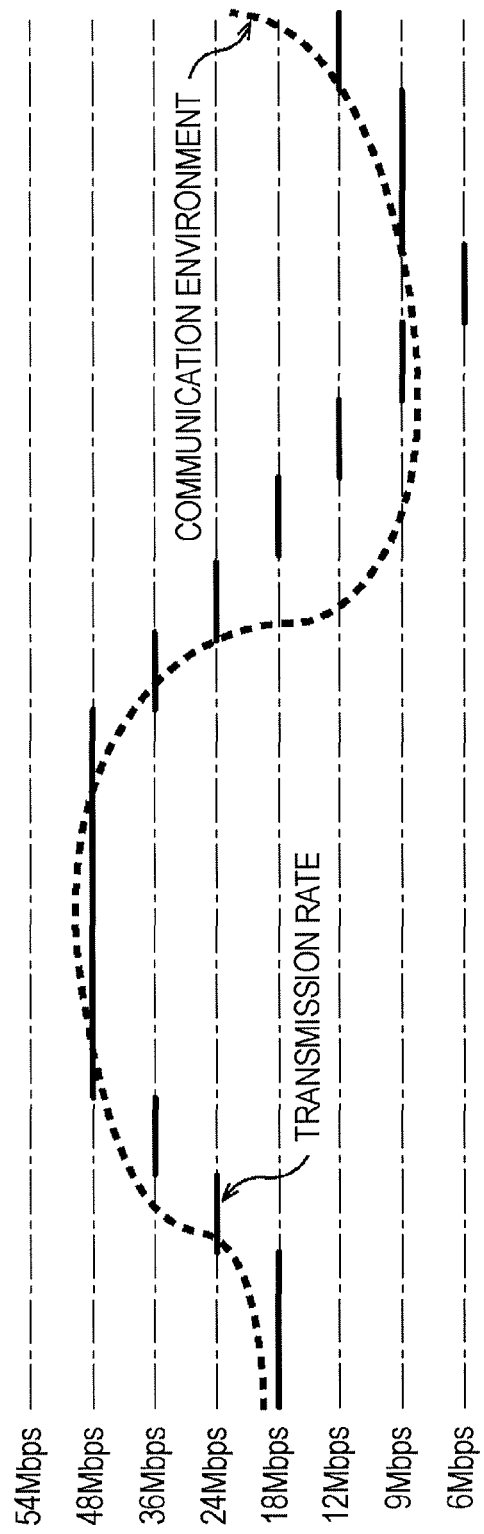
FIG. 1 is a graph illustrating how transmission rates are dynamically controlled in accordance with reception states.
Figure 2:
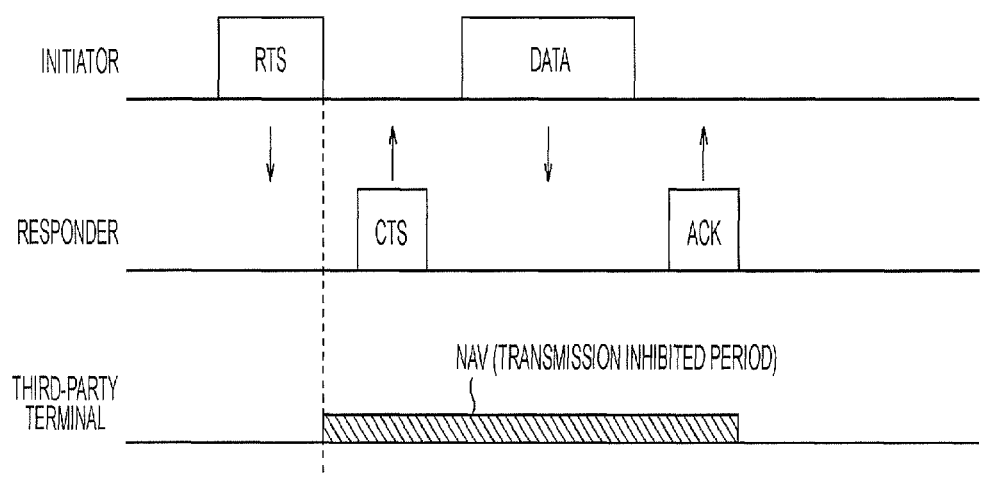
FIG. 2 illustrates a mechanism for preventing collision of packets in related art.
Figure 3:
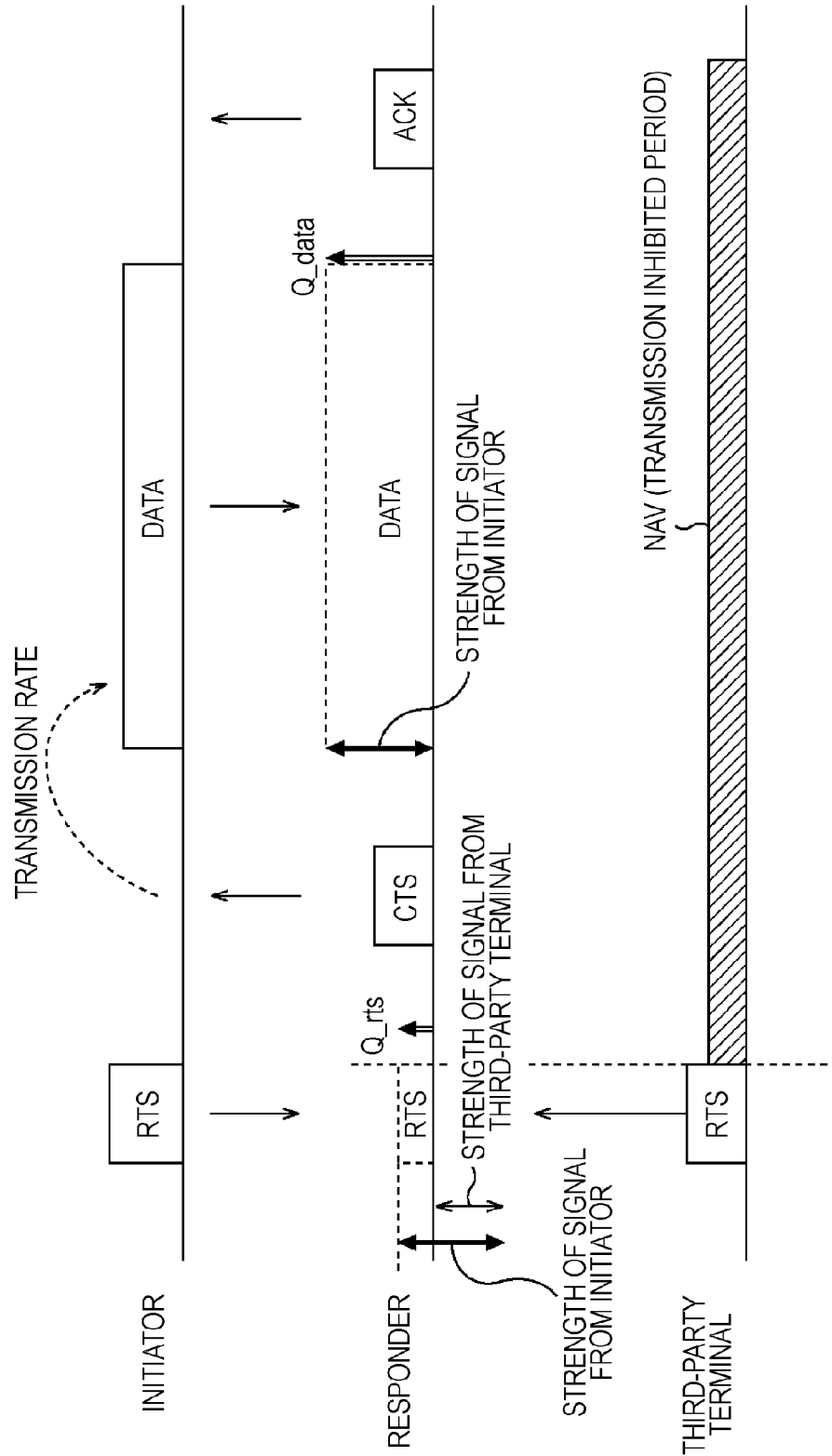
FIG. 3 illustrates a case in which an RTS packet from an initiator collides against an RTS packet from a third-party terminal.
Figure 4:
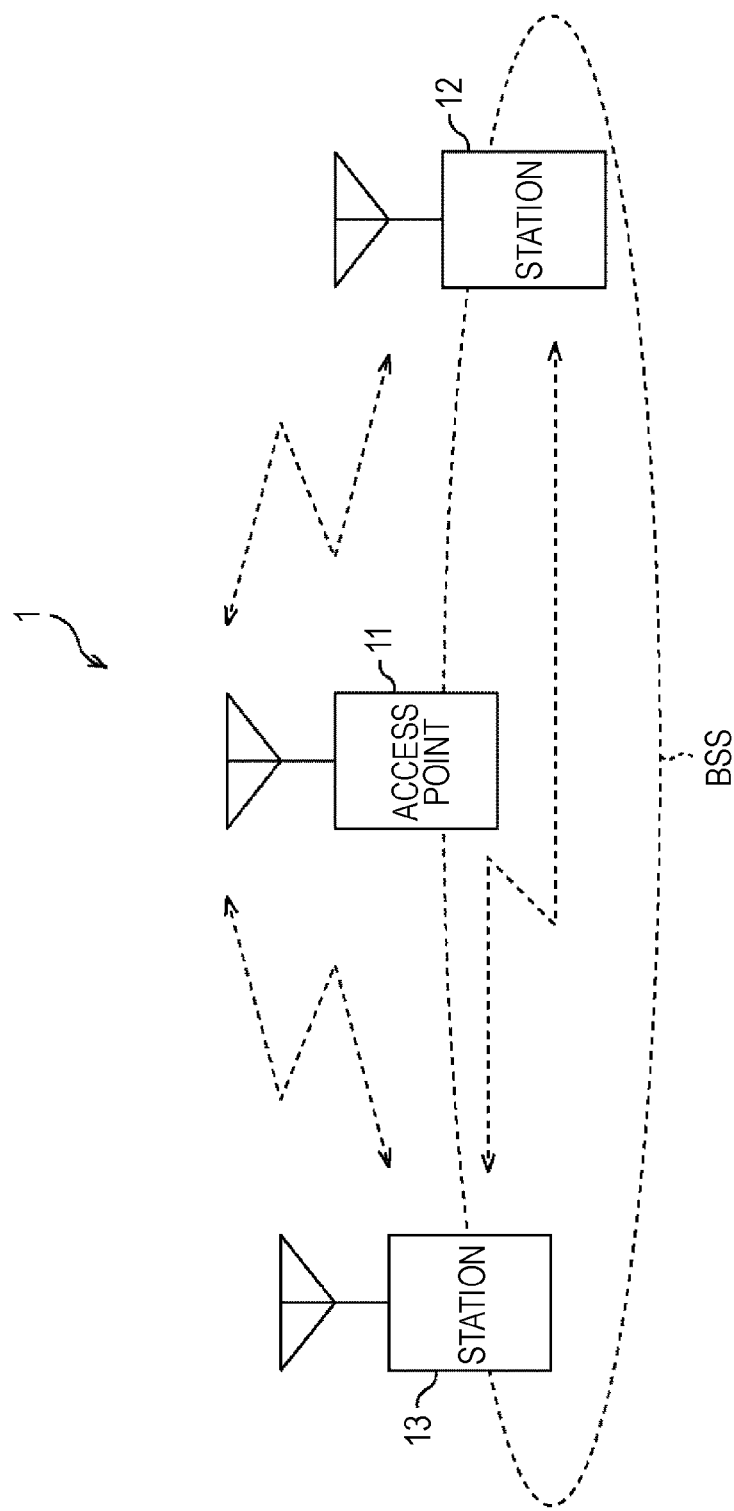
FIG. 4 illustrates an exemplary configuration of a wireless LAN system according to an embodiment of the present invention.

FIG. 4 illustrates an exemplary configuration of a wireless LAN system 1 according to an embodiment of the present invention.

Functions realized in the wireless LAN system 1 will now be described in order to facilitate understanding of the following description.

When the link adaptation using the RTS packet and the CTS packet is adopted, the transmission rate may not be set appropriately or the compatibility between the terminals may not be ensured, as described above. Accordingly, determination of a transmission rate by using the DATA packets has a higher possibility to select an appropriate transmission rate.

From the above point of view, it is possible to realize a method which does not use the combination of the RTS packet and the CTS packet and in which a responder uses the first DATA packet corresponding to data to be transmitted to determine the transmission rate, adds feedback information indicating the determined transmission rate to an ACK packet, and feeds back the feedback information added to the ACK packet to an initiator.

However, in the above method, it is necessary to reliably transmit the first DATA packet from the initiator to the responder and, therefore, the first DATA packet needs to be transmitted at a transmission rate close to the basic rate. For example, since the maximum size of a Media Access Control (MAC) Service Data Unit (MSDU) packet provided by the Application layer is about 1,500 bytes, the channel can be occupied for about 2.0 ms if this packet is to be transmitted at 6 Mbps, which is the basic rate defined in IEEE 802.11a.

In view of the fact that the maximum time period during which the transmission opportunity (TXOP) at the initiator is held is defined to be about 3.0 ms, using up about ⅔ of the TXOP by the use of the transmission rate that is not optimal for the channel does not lead to effective use of the channel. Fragmenting the packet into a smaller size in order to avoid the increased packet size only increases the overhead of the packet and does not contribute to improvement of the throughput. An increase in the transmission rate is required by the application layer in a network system, such as the wireless LAN, and the packet size tends to be increased with the increasing transmission rate that is required.

According to the embodiment of the present invention, for example, the amount of data of the first DATA packet transmitted from the initiator to the responder is made smaller than those of other DATA packets. This can reduce the amount of data that has to be transmitted at the basic rate to prevent unintended decrease of the throughput.

After the first DATA packet is transmitted, since the second and subsequent DATA packets are transmitted in accordance with the feedback information sent to the initiator with the ACK packets, it is possible to ensure the appropriate throughput.

The amount of data of the first DATA packet to be transmitted can be arbitrarily set as long as the throughput is not decreased by the transmission of the packet. However, according to the embodiment of the present invention, it is assumed for simplicity that the first DATA packet is transmitted in a null (empty) state.

In data exchange between devices conforming to IEEE 802.11n, a Quality of Service Null (QosNull) packet that only includes a MAC header and Cyclic Redundancy Check (CRC) and that is defined in IEEE 802.11n is used as the DATA packet in the null state.

An exemplary configuration of the wireless LAN system 1 according to the embodiment of the present invention will now be described.

As shown in FIG. 4, the wireless LAN system 1 includes an access point 11, a station 12, and a station 13. The access point 11, the station 12, and the station 13 conform to IEEE 802.11 and compose a basic service set (BSS), which is defined in IEEE 802.11 and which is a collection of concerned devices around the access point.

For example, since the station 12 and the station 13 move or the communication between the station 12 and the station 13 can be cut off in response to a user's request, the configuration of the wireless LAN system 1 is varied with time.

The access point 11 serves as the access point to the station 12 or the access point to the station 13. The access point 11 transmits and receives a signal of a predetermined frequency to establish wireless communication with the station 12 or the station 13.

The access point 11 periodically or aperiodically transmits a notification signal called a beacon to notify the station 12 and the station 13 of the transmission rate that can be used in the wireless LAN system 1 in order to ensure the compatibility between stations (the station 12 and the station 13) in the wireless LAN system 1.

Each of the station 12 and the station 13 is a portable wireless communication device, such as a mobile phone or a personal digital assistant (PDA). The station 12 transmits and receives a signal of a predetermined frequency to establish the wireless communication with the access point 11 or another device, such as the station 13, with which the station 12 can communicate. Similarly, the station 13 transmits and receives a signal of a predetermined frequency to establish the wireless communication with the access point 11 or another device, such as the station 12, with which the station 13 can communicate. The station 12 may not be communicatable with the station 13.

Figure 5:
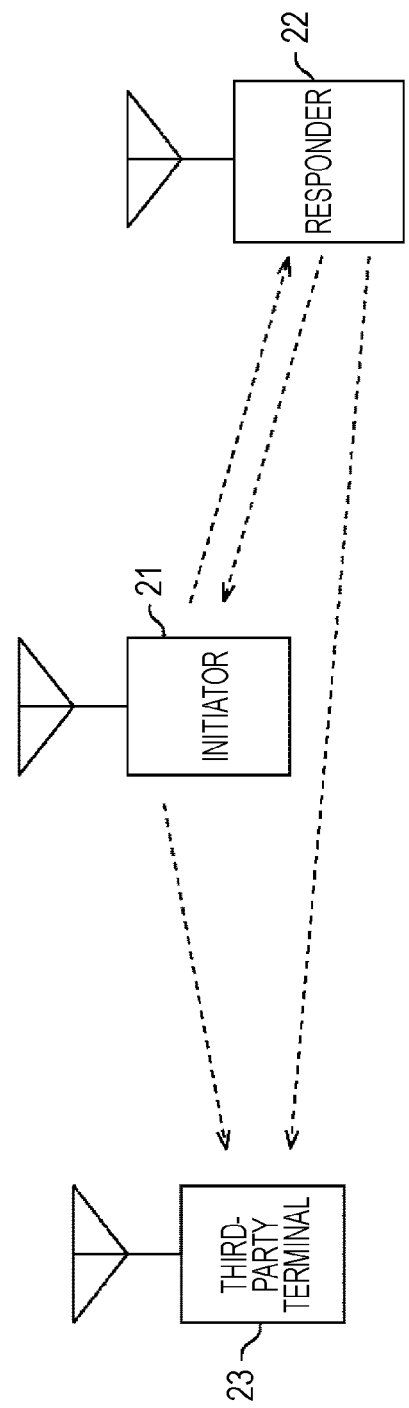
FIG. 5 illustrates an initiator, a responder, and a third-party terminal.

FIG. 5 illustrates an initiator 21, a responder 22, and a third-party terminal 23. The initiator 21 serves as a wireless communication device at the transmission side in the data communication between the access point 11 and the station 12 or in the data communication between the access point 11 and the station 13. The responder 22 serves as a wireless communication device at the reception side. The third-party terminal 23 is a wireless communication device that is not at the transmission side nor at the reception side, that is, a wireless communication device that does not concern the data communication. The link adaptation in the wireless LAN system 1 including the initiator 21, the responder 22, and the third-party terminal 23 will now be roughly described.

Figure 6:
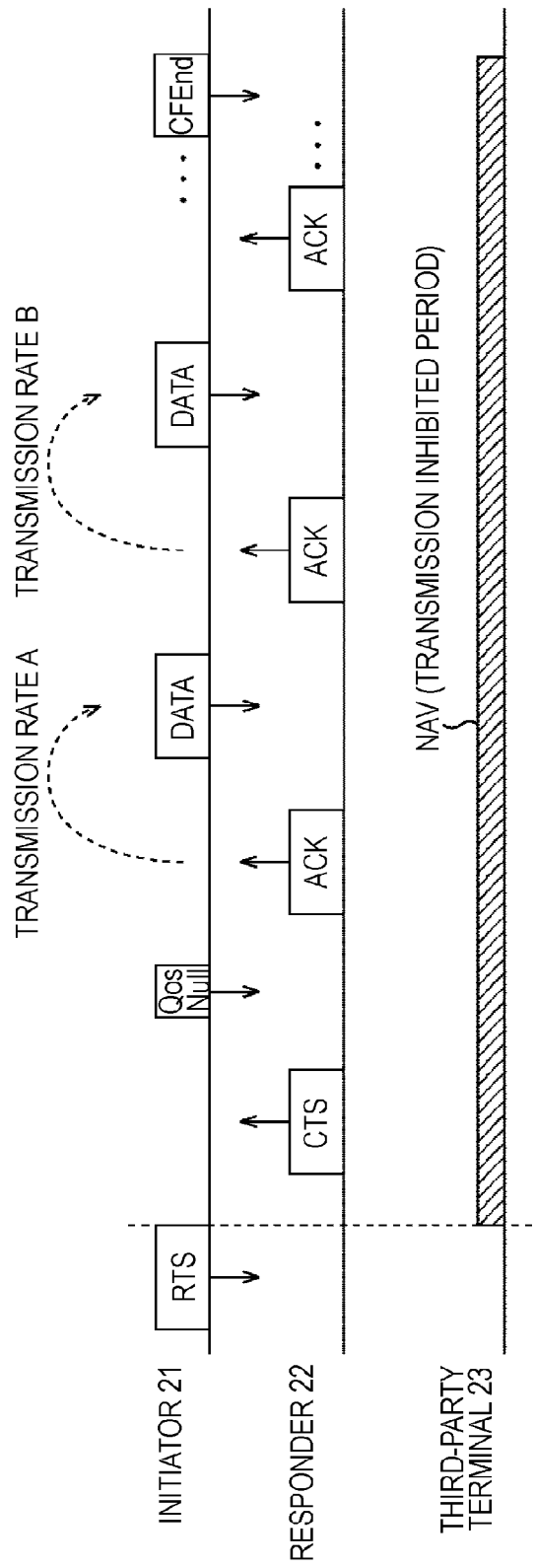
FIG. 6 roughly illustrates link adaptation in the wireless LAN system.

In the link adaptation, upon occurrence of a request to transmit data, the initiator 21 transmits an RTS packet on the wireless network, as shown in FIG. 6.

The MAC header of the RTS packet includes information indicating the responder 22 to which the data is transmitted and the duration indicating the transmission inhibited period.

The RTS packet transmitted from the initiator 21 adopts a format effective for all the devices conforming to IEEE 802.11 (this format hereinafter referred to as a legacy format). Accordingly, even if the initiator 21 and the responder 22 conform to, for example, IEEE 802.11n and the third-party terminal 23 conforms to, for example, IEEE 802.11a, the third-party terminal 23 can interpret the RTS packet from the initiator 21 and can reliably set the transmission inhibited period (the NAV or LongNAV when the third-party terminal 23 conforms to IEEE 802 11n).

Upon reception of the RTS packet transmitted from the initiator 21, the responder 22 transmits a CTS packet on the wireless network to respond to the RTS packet.

The MAC header of the CTS packet includes information indicating the initiator 21 to which the data is transmitted and the duration corresponding to the duration stored in the RTS packet.

The CTS packet transmitted from the responder 22 also adopts the legacy format mentioned above. Accordingly, even if the third-party terminal 23 conforms to, for example, IEEE 802.11a previous to IEEE 802.11n, the third-party terminal 23 can interpret the CTS packet and can reliably set the transmission inhibited period (the NAV or LongNAV).

Upon reception of the RTS packet or CTS packet, the third-party terminal 23 recognizes the duration as the transmission inhibited period and does not perform the communication during the transmission inhibited period. In the example shown in FIG. 6, the third-party terminal 23 has received the RTS packet and the transmission inhibited period is set after the reception of the RTS packet.

When the transmission inhibited period is set, only the initiator 21 acquires the TXOP during the transmission inhibited period and the communication is performed only between the initiator 21 and the responder 22.

Upon reception of the CTS packet transmitted from the responder 22, the initiator 21 transmits, for example, a QosNull packet to the responder 22 during the transmission inhibited period. The QosNull packet is a null packet which is defined in IEEE 802.11n and in which only the MAC header and the CRC are stored. The data length of a QosNull packet is shorter than that of a DATA packet.

The transmission rate of the QosNull packet is preferably set to a lower value so that the QosNull packet is reliably sent to the responder 22.

Upon reception of the QosNull packet transmitted from the initiator 21, the responder 22 selects a modulation method corresponding to the transmission rate (for example, a transmission rate A) appropriate for the reception state of the QosNull packet and transmits an ACK packet including feedback information indicating the modulation method to the initiator 21. For example, the responder 22 selects a modulation method corresponding to the transmission rate appropriate for the strength of the signal corresponding to the QosNull packet (that is, the transmission rate appropriate for the current communication environment).

Upon reception of the ACK packet transmitted from the responder 22 as the response to the QosNull packet which the initiator 21 has transmitted, the initiator 21 extracts the feedback information (for example, information about the modulation method corresponding to the transmission rate A) from the ACK packet. Then, the initiator 21 modulates a DATA packet in which data to be transmitted is stored by the modulation method corresponding to the extracted feedback information, that is, by the modulation method corresponding to the transmission rate A and transmits the modulated DATA packet to the responder 22.

In the link adaptation described above, the QosNull packet is transmitted after the transmission inhibited period is set (that is, so as not to collide against another packet) and the transmission rate of the DATA packet is determined in accordance with the reception state of the QosNull packet, so that the appropriate transmission rate can be set in the transmission of the DATA packet.

In addition, since the feedback information is stored in the ACK packet and the ACK packet including the feedback information is fed back to the initiator 21, it is possible for any wireless communication device conforming to IEEE 802.11 to interpret the feedback information.

Furthermore, since the QosNull packet in which only the MAC header and the CRC are stored and which has a shorter data length is transmitted to confirm the reception state of the responder 22, the current communication environment can be rapidly confirmed.

In the example shown in FIG. 6, combinations of the DATA packet and the ACK packet are used to control the transmission rate. Specifically, upon reception of the DATA packet transmitted from the initiator 21, the responder 22 selects a modulation method corresponding to the transmission rate (for example, a transmission rate B) appropriate for the strength of the signal corresponding to the DATA packet and transmits the ACK packet including the feedback information indicating the modulation method to the initiator 21 as the response to the DATA packet.

When the transmission of the DATA packet is to be terminated, the initiator 21 transmits a CF-End packet indicating that the transmission inhibited period is to be terminated on the wireless network.

Upon reception of the CF-End packet, the third-party terminal 23 clears the transmission inhibited period (the NAV).

Figure 7:
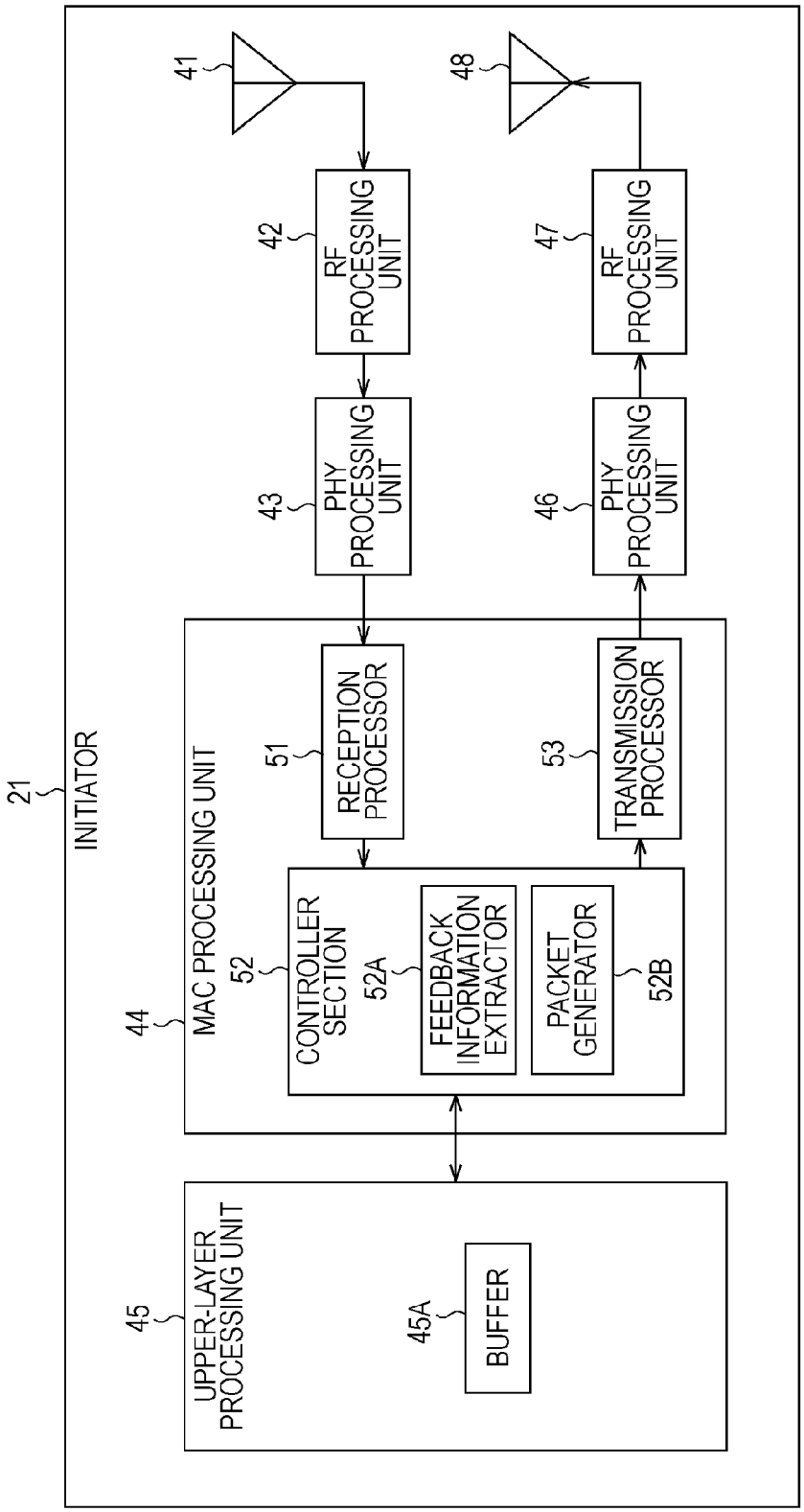
FIG. 7 is a block diagram showing an example of the internal configuration of the initiator.

FIG. 7 is a block diagram showing an example of the internal configuration of the initiator 21.

The initiator 21 includes an antenna 41, a radio-frequency (RF) processing unit 42, a PHY processing unit 43, a MAC processing unit 44, an upper-layer processing unit 45, a PHY processing unit 46, an RF processing unit 47, and an antenna 48. A "first transmitting unit" and a "second transmitting unit" includes the MAC processing unit 44, the PHY processing unit 46, the RF processing unit 47, and the antenna 48 in FIG. 7. A "receiving unit" includes the antenna 41, the RF processing unit 42, the PHY processing unit 43, and the MAC processing unit 44 in FIG. 7.

The antenna 41 supplies an RF signal corresponding to a signal transmitted from the responder 22 to the RF processing unit 42. The RF processing unit 42 performs certain processing to the RF signal supplied from the antenna 41 to generate a baseband signal and supplies the baseband signal to the PHY processing unit 43. The PHY processing unit 43 performs certain processing to the baseband signal supplied from the RF processing unit 42 to generate digital data at the MAC layer level and supplies the digital data at the MAC layer-level to the MAC processing unit 44.

The MAC processing unit 44 performs certain processing to the digital data supplied from the PHY processing unit 43 to read data stored in the packet received through the antenna 41, the RF processing unit 42, and the PHY processing unit 43 and supplies the read data to the upper-layer processing unit 45, or analyzes feedback information to determine the modulation method of the packet to be transmitted and notifies the PHY processing unit 46 of the determined modulation method.

The MAC processing unit 44 generates an RTS packet, a QosNull packet, or a DATA packet of the data supplied from the upper-layer processing unit 45, performs certain processing to the generated packet to generate digital data at the MAC layer level, and supplies the digital data at the MAC layer level to the PHY processing unit 46.

The upper-layer processing unit 45 stores the data to be transmitted to the responder 22 in a buffer 45A. When a certain amount of data has been stored in the buffer 45A, the upper-layer processing unit 45 supplies a request to transmit the data to the MAC processing unit 44.

The PHY processing unit 46 modulates the digital data supplied from the MAC processing unit 44 by the modulation method notified by the MAC processing unit 44 to generate a baseband signal and supplies the baseband signal to the RF processing unit 47.

The RF processing unit 47 performs certain processing to the baseband signal supplied from the PHY processing unit 46 to generate an RF signal and supplies the RF signal to the antenna 48. The antenna 48 transmits a signal corresponding to the RF signal supplied from the RF processing unit 47 to, for example, the responder 22.

An example configuration of the MAC processing unit 44 will now be described. The MAC processing unit 44 includes a reception processor 51, a controller section 52, and a transmission processor 53.

The reception processor 51 supplies the packet resulting from certain processing to the digital data supplied from the PHY processing unit 43 (that is, the packet transmitted from the responder 22) to the controller section 52.

A feedback information extractor 52A in the controller section 52 extracts feedback information from the packet supplied from the reception processor 51 to the controller section 52 and notifies the PHY processing unit 46 through the transmission processor 53 of the modulation method indicated in the feedback information.

A packet generator 52B in the controller section 52 generates a certain packet in accordance with the packet supplied from the reception processor 51 and supplies the generated packet to the transmission processor 53.

The transmission processor 53 performs certain processing to the packet supplied from the controller section 52 to generate digital data at the MAC layer level and supplies the digital data at the MAC layer level to the PHY processing unit 46.

Figure 8:
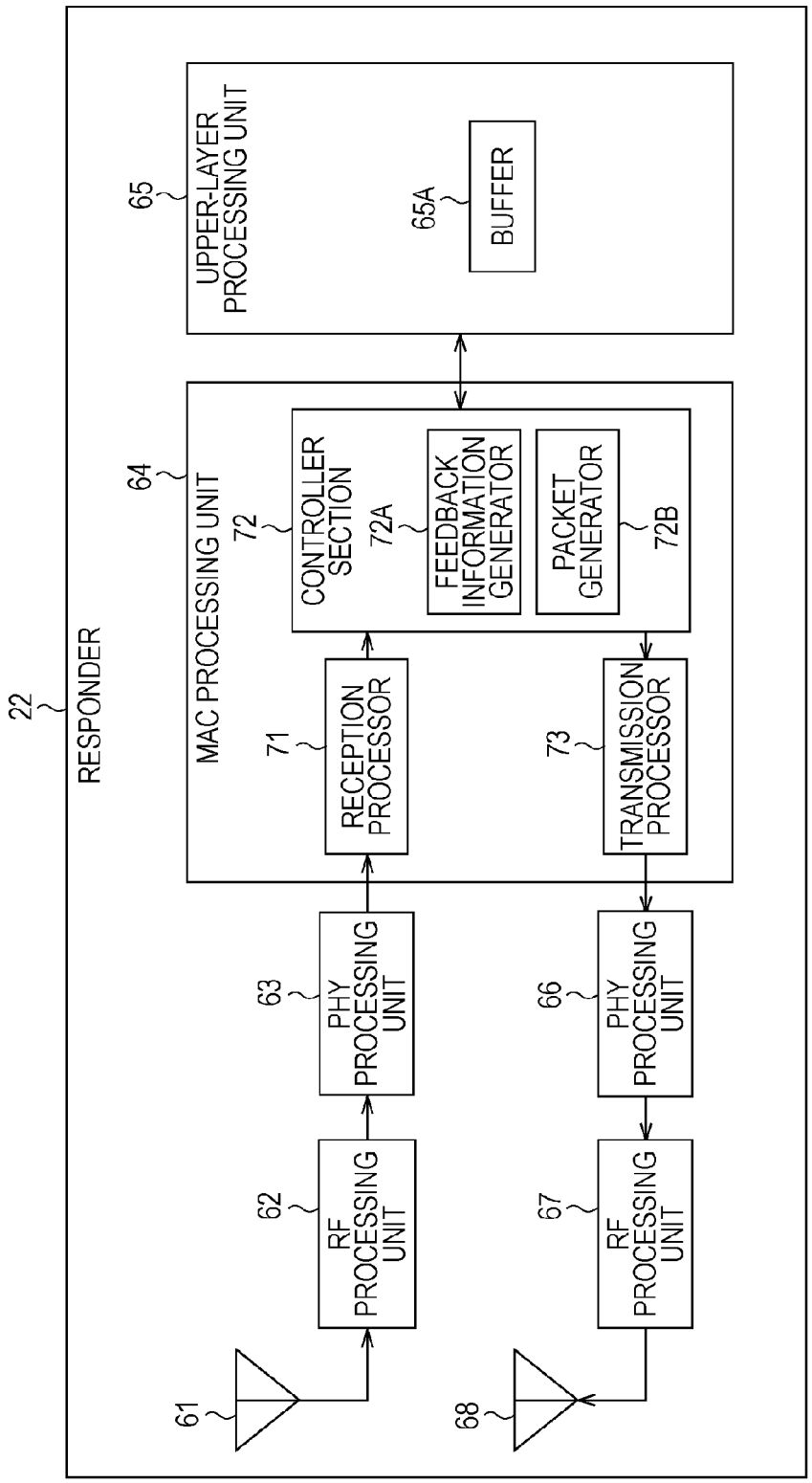
FIG. 8 is a block diagram showing an example of the internal configuration of the responder.

FIG. 8 is a block diagram showing an example of the internal configuration of the responder 22.

The responder 22 includes an antenna 61, an RF processing unit 62, a PHY processing unit 63, a MAC processing unit 64, an upper-layer processing unit 65, a PHY processing unit 66, an RF processing unit 67, and an antenna 68.

The antenna 61 supplies an RF signal corresponding to a signal transmitted from the initiator 21 to the RF processing unit 62. The RF processing unit 62 performs certain processing to the RF signal supplied from the antenna 61 to generate a baseband signal and supplies the baseband signal to the PHY processing unit 63.

The PHY processing unit 63 performs certain processing to the baseband signal supplied from the RF processing unit 62 to generate digital data at the MAC layer level and supplies the digital data at the MAC layer level to the MAC processing unit 64. The PHY processing unit 63 generates information (in this case, channel information described below) indicating the reception state (the communication environment) on the basis of the baseband signal supplied from the RF processing unit 62 and supplies the generated information to the MAC processing unit 64.

The MAC processing unit 64 supplies a packet resulting from certain processing to the digital data supplied from the PHY processing unit 63 to the upper-layer processing unit 65. The MAC processing unit 64 generates a CTS packet or an ACK packet including the feedback information corresponding to the channel information depending on the received packet and supplies digital data at the MAC layer level, resulting from certain processing to the generated packet, to the PHY processing unit 66.

The upper-layer processing unit 65 extracts data stored in the packet supplied from the MAC processing unit 64 and stores the extracted data in a buffer 65A. The upper-layer processing unit 65 reads data from the buffer 65A and performs certain processing. For example, when the readout data is image data, the upper-layer processing unit 65 displays the image data in a display screen (not shown).

The PHY processing unit 66 performs certain processing to the digital data supplied from the MAC processing unit 64 to generate a baseband signal and supplies the baseband signal to the RF processing unit 67. The RF processing unit 67 performs certain processing to the baseband signal supplied from the PHY processing unit 66 to generate an RF signal and supplies the RF signal to the antenna 68. The antenna 68 transmits a signal corresponding to the RF signal supplied from the RF processing unit 67 to, for example, the initiator 21.

An example configuration of the MAC processing unit 64 will now be described. The MAC processing unit 64 includes a reception processor 71, a controller section 72, and a transmission processor 73.

The reception processor 71 supplies a packet resulting from certain processing to the digital data supplied from the PHY processing unit 63 to the controller section 72.

A feedback information generator 71A in the controller section 72 selects a modulation method corresponding to the transmission rate to be fed back to the initiator 21 from predetermined multiple modulation methods on the basis of the channel information supplied from the PHY processing unit 63 through the reception processor 71 and generates feedback information indicating the selected modulation method.

A packet generator 72B in the controller section 72 generates a certain packet in accordance with the packet supplied from the reception processor 71 (the received packet). For example, the packet generator 72B generates a CTS packet when the received packet is an RTS packet and generates an ACK packet including the feedback information generated by the feedback information generator 71A when the received packet is a QosNull packet or a DATA packet. The controller section 72 supplies the generated packet to the transmission processor 73.

The transmission processor 73 performs certain processing to the packet supplied from the packet generator 72B in the controller section 72 to generate digital data at the MAC layer level and supplies the digital data at the MAC layer level to the PHY processing unit 66.

Figure 9:
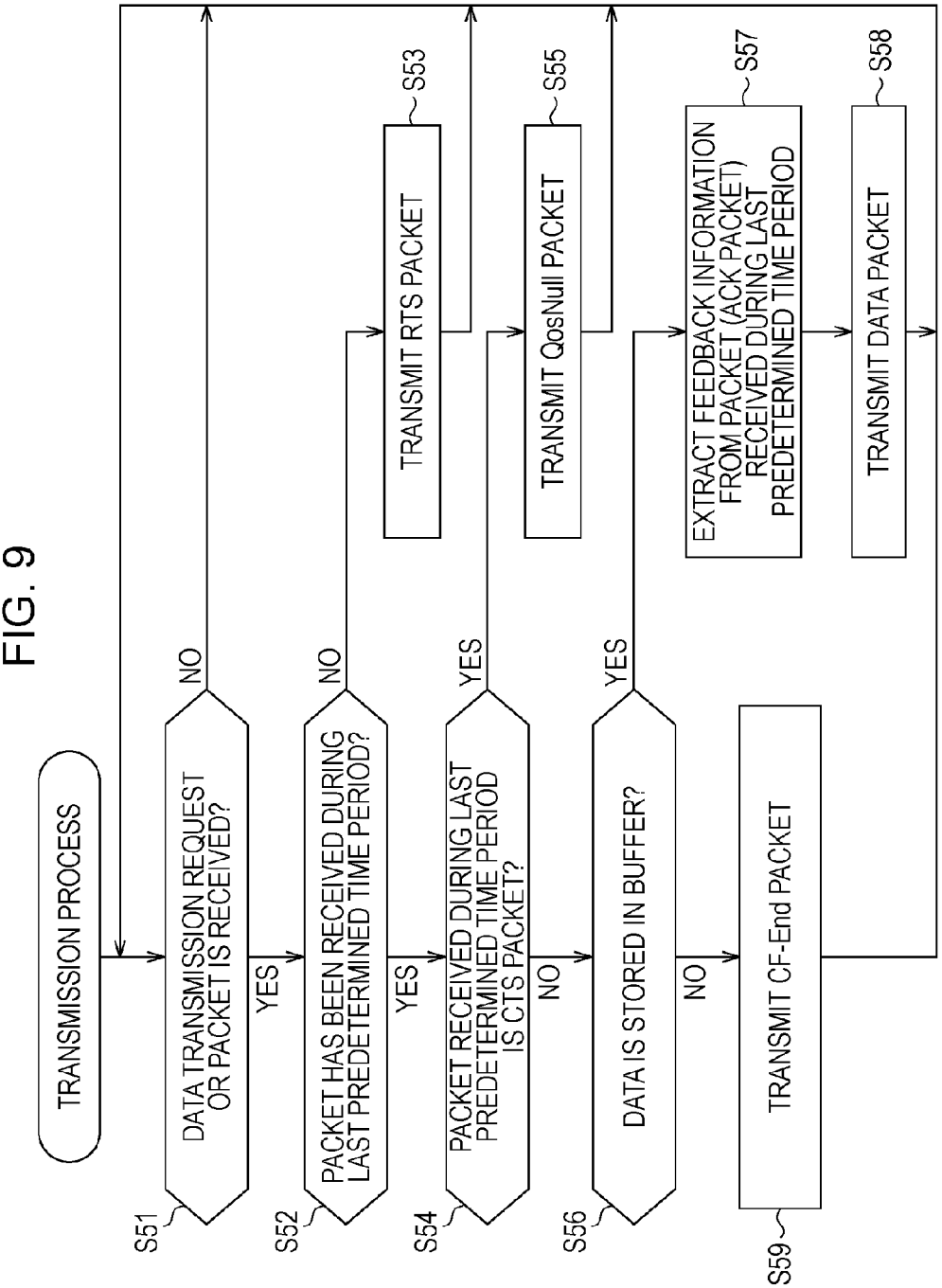
FIG. 9 is a flowchart showing an example of a transmission process in the initiator.

FIG. 9 is a flowchart showing an example of a transmission process in the initiator 21.

The transmission process is started, for example, when the initiator 21 is turned on.

In Step S51, the packet generator 52B in the controller section 52 in the MAC processing unit 44 waits for reception of a request to transmit data or reception of a packet in a reception process described below. If the packet generator 52B determines in Step S51 that a request to transmit data or a packet is received, then in Step S52, the packet generator 52B determines whether a packet has been received during a last predetermined time period. The "packet received during a last predetermined time period" means, for example, a packet received within the last 16 µs corresponding to Short Inter Frame Space (SIFS), which is the time interval of packets defined in IEEE 802.11n. The "last predetermined time period" means a time interval corresponding to the SIFS before the current time.

If it is determined in Step S52 that no packet has been received during the last predetermined time period, then in Step S53, the packet generator 52B in the controller section 52 in the MAC processing unit 44 generates an RTS packet to be subsequently transmitted and supplies the generated RTS packet to the PHY processing unit 46. The RTS packet supplied to the PHY processing unit 46 is modulated by the modulation method corresponding to the basic rate and the modulated RTS packet is transmitted to the responder 22 and the third-party terminal 23 through the RF processing unit 47 and the antenna 48. After the RTS packet is transmitted to the responder 22 and the third-party terminal 23 in the above manner, the process goes back to Step S51 to repeat the same steps.

If it is determined in Step S52 that a packet has been received during the last predetermined time period, then in Step S54, the packet generator 52B in the controller section 52 in the MAC processing unit 44 determines whether the packet received during the last predetermined time period is a CTS packet. If it is determined in Step S54 that the packet received during the last predetermined time period is a CTS packet, then in Step S55, the packet generator 52B generates a QosNull packet to be subsequently transmitted and supplies the generated QosNull packet to the PHY processing unit 46. The QosNull packet supplied to the PHY processing unit 46 is modulated by the modulation method corresponding to the basic rate and the modulated QosNull packet is transmitted to the responder 22 through the RF processing unit 47 and the antenna 48. After the QosNull packet is transmitted to the responder 22 in the above manner, the process goes back to Step S51 to repeat the same steps.

If it is determined in Step S54 that the packet received during the last predetermined time period is not a CTS packet (that is, is an ACK packet), then in Step S56, the packet generator 52B in the controller section 52 in the MAC processing unit 44 determines whether any data is stored in the buffer 45A in the upper-layer processing unit 45.

If it is determined in Step S56 that any data is stored in the buffer 45A in the upper-layer processing unit 45, then in Step S57, the packet generator 52B in the controller section 52 in the MAC processing unit 44 reads out data from the buffer 45A in the upper-layer processing unit 45, generates a DATA packet (MSDU packet) including the readout data, and supplies the DATA packet to the PHY processing unit 46. The feedback information extractor 52A in the controller section 52 in the MAC processing unit 44 extracts feedback information from the received ACK packet (the ACK packet supplied from the PHY processing unit 43) and notifies the PHY processing unit 46 of the modulation method indicated in the feedback information. In Step S58, the DATA packet (MSDU packet) supplied to the PHY processing unit 46 is modulated by the indicated modulation method and is transmitted to the responder 22 through the RF processing unit 47 and the antenna 48. After the DATA packet (MSDU packet) is transmitted to the responder 22 in the above manner, the process goes back to Step S51 to repeat the same steps.

If it is determined in Step S56 that no data is stored in the buffer 45A in the upper-layer processing unit 45, then in Step S59, the packet generator 52B in the controller section 52 in the MAC processing unit 44 generates a CF-End packet to be subsequently transmitted and supplies the generated CF-End packet to the PHY processing unit 46. The CF-End packet supplied to the PHY processing unit 46 is modulated by the modulation method corresponding to a certain transmission rate and is transmitted to the responder 22 and the third-party terminal 23 through the RF processing unit 47 and the antenna 48. After the CF-End packet is transmitted to the responder 22 and the third-party terminal 23 in the above manner, the process goes back to Step S51 to repeat the same steps.

Although the CF-End packet is transmitted in Step S59 in the above transmission process, Step S59 may be skipped and the CF-End packet may not be transmitted because the transmission of the CF-End packet is optional.

FIG. 10 is a flowchart showing an example of a reception process in the initiator 21.

The reception process is started when the initiator 21 is turned on.

In Step S71, a packet (for example, a CTS packet or an ACK packet) received through the antenna 41 is supplied to the MAC processing unit 44 through the RF processing unit 42 and the PHY processing unit 43. The MAC processing unit 44 reads out data stored in the packet and supplies the readout data to the upper-layer processing unit 45 or analyzes the feedback information to detect the modulation method indicated in the feedback information. Then, the process goes back to Step S71 to repeat the same step.

FIG. 11 is a flowchart showing an example of a response process in the responder 22.

The response process is started when the responder 22 is turned on.

In Step S91, the packet generator 72B in the controller section 72 in the MAC processing unit 64 waits for reception of a packet (for example, an RTS packet, a QosNull packet, or a DATA packet) in a reception process described below. If the packet generator 72B determines in Step S91 that a packet is received, then in Step S92, the packet generator 72B determines whether the received packet is an RTS packet. If it is determined in Step S92 that the received packet is an RTS packet, then in Step S93, the packet generator 72B in the controller section 72 in the MAC processing unit 64 generates a CTS packet to be transmitted and supplies the generated CTS packet to the PHY processing unit 66. The CTS packet supplied to the PHY processing unit 66 is transmitted to the initiator 21 through the RF processing unit 67 and the antenna 68. After the CTS packet is transmitted to the initiator 21 in the above manner, the process goes back to Step S91 to repeat the same steps.

If the packet generator 72B determines in Step S92 that the received packet is not an RTS packet, then in Step S94, the packet generator 72B in the controller section 72 in the MAC processing unit 64 determines whether the received packet is a CF-End packet.

If it is determined in Step S94 that the received packet is not a CF-End packet (that is, the received packet is a QosNull packet or a DATA packet), then in Step S95, the packet generator 72B in the controller section 72 in the MAC processing unit 64 generates an ACK packet to be subsequently transmitted. The feedback information generator 71A in the controller section 72 in the MAC processing unit 64 selects a modulation method corresponding to the transmission rate to be fed back to the initiator 21 from predetermined multiple modulation methods on the basis of the channel information corresponding to the QosNull packet or the DATA packet supplied from the PHY processing unit 63 and generates feedback information indicating the modulation method.

In Step S96, the packet generator 72B in the controller section 72 in the MAC processing unit 64 stores the generated feedback information in the ACK packet and supplies the ACK packet including the feedback information to the PHY processing unit 66. The ACK packet supplied to the PHY processing unit 66 is transmitted to the initiator 21 through the RF processing unit 67 and the antenna 68. After the ACK packet is transmitted to the initiator 21 in the above manner, the process goes back to Step S91 to repeat the same steps.

If it is determined in Step S94 that the received packet is a CF-End packet, the packet generator 72B in the controller section 72 in the MAC processing unit 64 recognizes that the transmission of data from the initiator 21 is finished and the process goes back to Step S91 to repeat the same steps.

Figure 12:
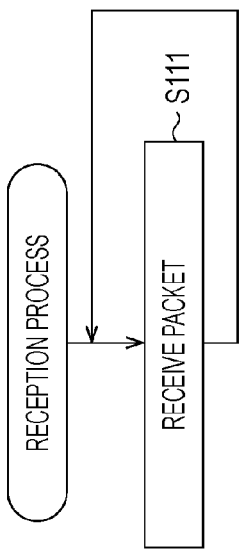
FIG. 12 is a flowchart showing an example of a reception process in the responder.

FIG. 12 is a flowchart showing an example of a reception process in the responder 22.

The reception process is started when the responder 22 is turned on.

In Step S111, a packet (for example, a RTS packet, a QosNull packet, or a DATA packet) received through the antenna 61 is supplied to the MAC processing unit 64 through the RF processing unit 62 and the PHY processing unit 63. The MAC processing unit 64 supplies the packet to the upper-layer processing unit 65 and the data in the packet is stored in the buffer 65A in the upper-layer processing unit 65. Then, the process goes back to Step S111 to repeat the same step.

The channel information and the feedback information will now be described in detail.

Figure 13:
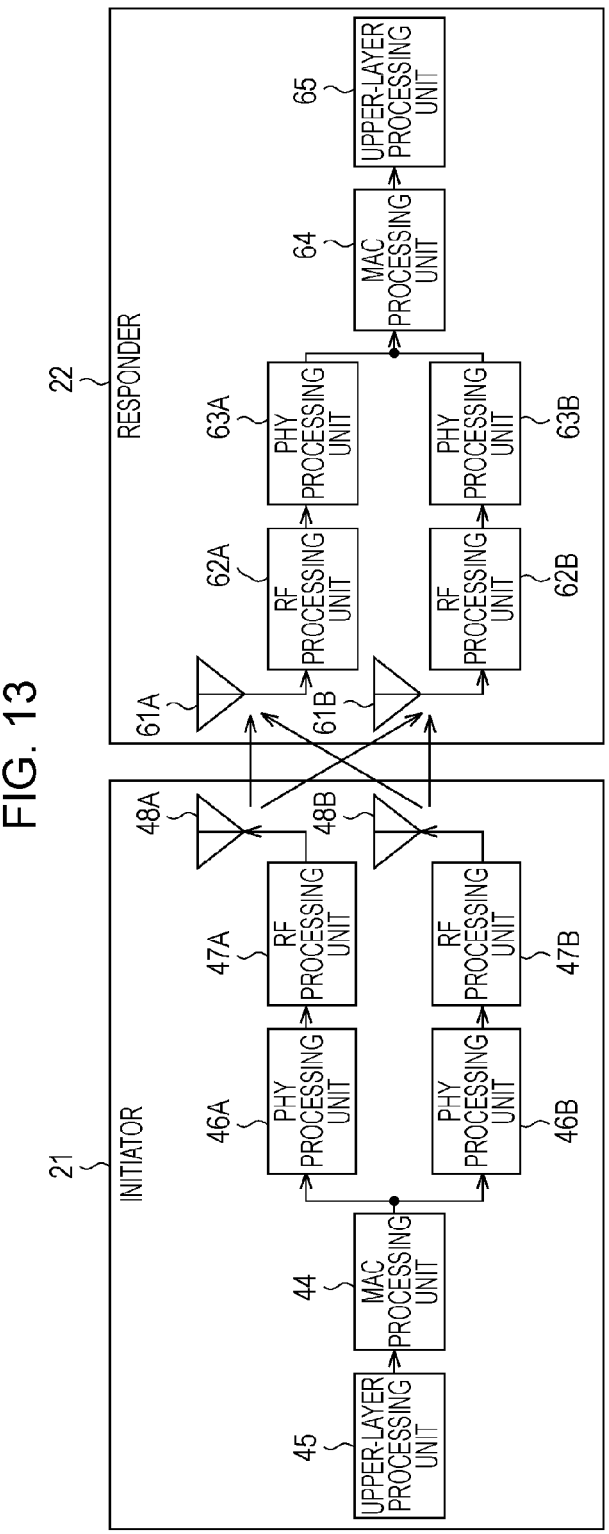
FIG. 13 is a block diagram showing an example of a MIMO configuration of the initiator and the responder.

An MIMO configuration shown in FIG. 13 is exemplified here. In the MIMO configuration, the initiator 21 includes multiple (for example, two) transmission antennas and the responder 22 includes multiple (for example, two) reception antennas.

The MIMO is a wireless communication method in which both the transmission device and the reception device includes multiple antennas and is adopted in IEEE 802.11n. Since signals are concurrently transmitted and received through the multiple antenna in this method, a higher transmission rate is realized, compared with a case where signals are transmitted and received through one antenna.

The initiator and the responder in the MIMO configuration each include not only multiple antennas but also multiple RF processing units and multiple PHY processing units.

For example, in the example shown in FIG. 13, the initiator 21 includes two PHY processing units 46A and 46B, two RF processing units 47A and 47B, and two antennas 48A and 48B. Similarly, the responder 22 includes two antennas 61A and 61B, two RF processing units 62A and 62B, and two PHY processing units 63A and 63B.

In the initiator 21, the MAC processing unit 44 supplies digital data resulting from certain processing to a packet to be transmitted to the PHY processing units 46A and 46B, and the PHY processing units 46A and 46B supply a baseband signal resulting from certain processing to the digital data supplied from the MAC processing unit 44 to the RF processing units 47A and the 47B, respectively. The signal supplied from the PHY processing unit 46A to the RF processing unit 47A is transmitted from the RF processing unit 47A to, for example, the responder 22 through the antenna 48A. Similarly, the signal supplied from the PHY processing unit 46B to the RF processing unit 47B is transmitted from the RF processing unit 47B to, for example, the responder 22 through the antenna 48B.

In the responder 22, the signal transmitted from the initiator 21 is supplied to the PHY processing unit 63A through the antenna 61A and the RF processing unit 62A and, similarly, the signal transmitted from the initiator 21 is supplied to the PHY processing unit 63B through the antenna 61B and the RF processing unit 62B. The PHY processing units 63A and 63B supply digital data resulting from certain processing to the baseband signals supplied from the RF processing unit 62A and the RF processing unit 62B, respectively, to the MAC processing unit 64. The MAC processing unit 64 rebuilds the digital data supplied from the PHY processing units 63A and 63B.

For example, it is assumed that baseband signals S1 and S2 resulting from certain processing in the PHY processing units 46A and 46B in the initiator 21 have signal strengths s1 and s2, respectively. It is also assumed that baseband signals R1 and R2 that correspond to the signals S1 and S1 (that are transmitted from the initiator 21 to the responder 22) and that are supplied to the PHY processing units 63A and 63B in the responder 22 have signal strengths r1 and r2, respectively.

The signal strengths s1 and s2 can be calculated according to Expression (1) by using the signal strengths r1 and r2 and a certain matrix A called a channel matrix.

$$\begin{pmatrix} r_1 \\ r_2 \end{pmatrix} = (\text{matrix } A) \begin{pmatrix} s_1 \\ s_2 \end{pmatrix} \qquad (1)$$

The PHY processing units 63A and 63B in the responder 22 compare a signal sequence determined in advance between the initiator 21 and the responder 22 with the signal R1 or R2 and perform a certain calculation to estimate the matrix A. For example, the matrix A is used as the channel information. The MAC processing unit 64 in the responder 22 calculates an inverse matrix $A^{-1}$ shown in Expression (2) from the matrix A, which is the channel information.

$$A^{-1} = \begin{pmatrix} a_{11} & a_{12} \\ a_{21} & a_{22} \end{pmatrix} \qquad (2)$$

The MAC processing unit 64 in the responder 22 calculates the signal strength at the reception given by contribution of the signal S1 as a sum of an element $a_{11}$ and an element $a_{12}$ of the inverse matrix $A^{-1}$ and calculates the signal strength at the reception given by contribution of the signal S2 as a sum of an element $a_{21}$ and an element $a_{22}$ of the inverse matrix $A^{-1}$. The MAC processing unit 64 selects the modulation methods of the signal S1 and the signal S2 in accordance with the ratio between the signal strength at the reception given by contribution of the signal S1 and the signal strength at the reception given by contribution of the signal S2.

Specifically, the MAC processing unit 64 allocates a modulation method with a lower transmission rate and a lower required signal-to-noise (S/N) ratio to the signal having the lower signal strength in the signal strength at the reception given by contribution of the signal S1 and the signal strength at the reception given by contribution of the signal S2, and allocates a modulation method with a higher transmission rate and a higher required S/N ratio to the signal having the higher signal strength.

For example, binary phase shift keying (BPSK), quadrature phase shift keying (QPSK), quadrature amplitude modulation (16QAM), and 64QAM, which are arranged in ascending order of the required S/N ratio, can be used as the modulation method.

For example, if the ratio between the signal strength at the reception given by contribution of the signal S1 and the signal strength at the reception given by contribution of the signal S2 is equal to 2:1, the MAC processing unit 64 allocates the 16QAM as the modulation method of the signal S1 and allocates the QPSK as the modulation method of the signal S2. If the ratio between the signal strength at the reception given by contribution of the signal S1 and the signal strength at the reception given by contribution of the signal S2 is equal to 10:1, the MAC processing unit 64 allocates the 64QAM as the modulation method of the signal S1 and allocates the BPSK as the modulation method of the signal S2.

The MAC processing unit 64 generates the feedback information indicating the modulation methods allocated in the above manner.

Although the MAC processing unit 64 allocates the modulation methods by using the ratio between the signal strength at the reception given by contribution of the signal S1 and the signal strength at the reception given by contribution of the signal S2, the MAC processing unit 64 may allocate the modulation methods on the basis of the respective S/N ratios of the signals S1 and S2.

FIG. 14 is a table showing experimental results of data transmission in a wireless LAN system in the related art using the RTS packet and the CTS packet and in the wireless LAN system 1 using the QosNull packet and ACK packet.

In a 1AP1STA environment (one access point and one station) and a stationary environment (station is almost stationary), as shown in the second line in FIG. 14, the wireless LAN system in the related art had a throughput of 74.5 Mbps whereas the wireless LAN system 1 had a throughput of 82.4 Mbps. The throughput of the wireless LAN system 1 was 7.9 Mbps higher than that of the wireless LAN system in the related art.

In a 1AP3STA environment, (one access point and three stations) and a two-terminals moving environment (two stations are moving), as shown in the third line in FIG. 14, the wireless LAN system in the related art had a throughput of 32.1 Mbps whereas the wireless LAN system 1 had a throughput of 33.7 Mbps. The throughput of the wireless LAN system 1 was 1.6 Mbps higher than that of the wireless LAN system in the related art.

According to the experimental results, the wireless LAN system 1 using the QosNull packet and the ACK packet had higher throughputs than the wireless LAN system in the related art with the number of stations varied. Since the wireless LAN system 1 transmits and receives the QosNull packet and the ACK packet in addition to the RTS packet and the CTS packet, the overhead of the wireless LAN system 1 is increased. However, as shown in FIG. 14, the DATA packets that are transmitted at appropriate transmission rates have a larger effect than the increased overhead, thus increasing the throughputs.

Both in the wireless LAN system 1 and in the wireless LAN system in the related art, the 1AP3STA environment (two-terminals moving environment) had lower throughputs than the 1AP1STA environment (stationary environment). This is because the scramble for the transmission opportunity (TXOP) is caused by the doubled number of the wireless communication devices in the wireless LAN systems in the 1AP3STA environment.

As described above, the initiator 21 transmits the QosNull packet including, for example, null data to the responder 22 during the transmission inhibited period, receives the ACK packet including the information (feedback information) corresponding to the communication environment at the reception of the QosNull packet at the responder 22 from the responder 22, and transmits the DATA packet including data of a certain length to the responder 22 at the transmission rate appropriate for the information that is included in the received ACK packet and that is corresponds to the communication environment. In addition, the data length of, for example, the null data stored in the QosNull packet is made shorter than the data length of the data stored in the DATA packet. In other words, since the DATA packet is transmitted at the transmission rate appropriate for the communication environment at the reception of the QosNull packet transmitted during the transmission inhibited period, the transmission rate can be appropriately controlled.

Since the initiator 21 transmits all the DATA packets including the first DATA packet at the appropriate transmission rate, the DATA packets can be stably transmitted regardless of the packet size of the DATA packet (MSDU packet) supplied from the application layer (upper layer).

Since it is sufficient for the initiator 21 to transmit the data at the transmission rate appropriate for the feedback information that is extracted from the ACK packet transmitted from the responder 22, there is no need to install an additional mechanism for selecting the transmission rate, thus reducing the size of the circuit.

Although both the transmission antenna (the antenna at the transmission side) and the reception antenna (the antenna at the reception side) are provided in the initiator 21 and the responder 22, the transmission antenna may serve as the reception antenna. In this case, for example, the circuits (the RF processing unit and the PHY processing unit) at the transmission side or at the reception side, which are connected to the antenna at the transmission or at the reception, are switched to share the antenna between the circuits at the transmission side and the circuits at the reception side.

Although the MIMO configuration in which multiple transmission antennas are provided in the initiator 21 and multiple reception antennas are provided in the responder 22 is adopted in the embodiment of the present invention, one transmission antenna may be provided in the initiator 21 and one reception antenna may be provided in the responder 22.

Although the channel matrix is used as the channel information, for example, the RSSI indicating the signal strength of a received signal may be used.

The series of processing described above may be performed by hardware or software. When the series of processing is performed by software, the programs composing the software are installed from a program recording medium in a computer incorporated in dedicated hardware or in, for example, a general-purpose computer capable of installing various programs to execute various functions.

Figure 15:
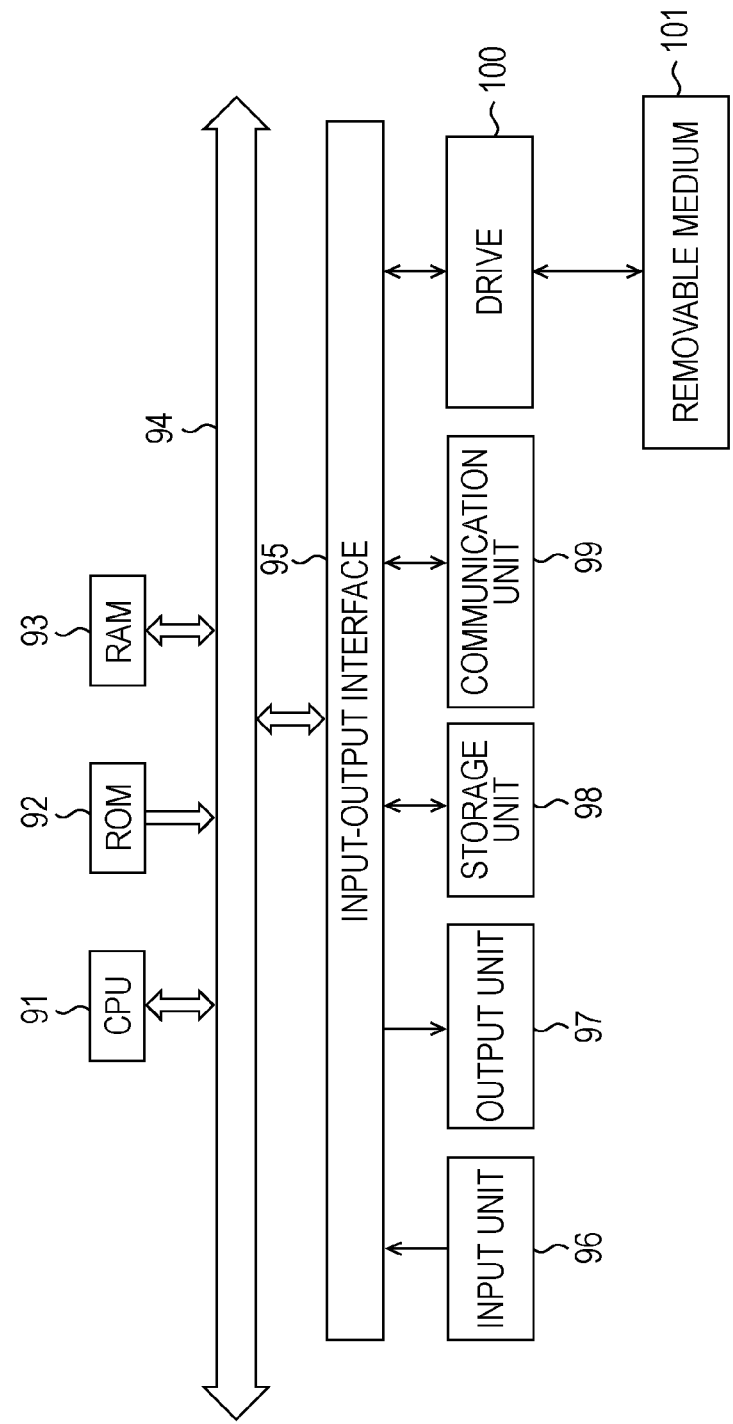
FIG. 15 is a block diagram showing an example of the hardware configuration of a computer according to an embodiment of the present invention.

FIG. 15 is a block diagram showing an example of the hardware configuration of a computer performing the series of processing with programs.

In the computer shown in FIG. 15, a central processing unit (CPU) 91, a read only memory (ROM) 92, and a random access memory (RAM) 93 are connected to each other via a bus 94.

An input-output interface 95 is also connected to the bus 94. An input unit 96 including a keyboard, a mouse, and a microphone, an output unit 97 including a display and a speaker, a storage unit 98, a communication unit 99, and a drive 100 are connected to the input-output interface 95. The storage unit 98 is, for example, a hard disk or a non-volatile memory. The communication unit 99 is, for example, a network interface. The drive 100 drives a removable medium 101, such as a magnetic disk, an optical disk, a magneto-optical disk, or a semiconductor memory.

In the computer configured in the above manner, the CPU 91 loads programs stored in, for example, the storage unit 98 in the RAM 93 through the input-output interface 95 and the bus 94 and executes the loaded programs to perform the series of processing described above.

The programs executed by the computer (the CPU 91) are recorded in the removable medium 101, which is a package medium, such as a magnetic disk (including a flexible disk), an optical disk (such as compact disc-read only memory (CD-ROM) or a digital versatile disk (DVD)), a magneto-optical disk, or a semiconductor memory, or are supplied through a wired or wireless transmission medium, such as a local area network, the Internet, or digital satellite broadcasting.

The programs may be loaded in the storage unit 98 through the input-output interface 95 by loading the removable medium 101 in the drive 100. The programs may be received by the communication unit 99 through the wired or wireless transmission medium to be installed in the storage unit 98. The programs may be installed in the ROM 92 or the storage unit 98 in advance.

The programs executed by the computer may be processed in time series in the described sequence or may be processed in parallel or at a required timing, such as in response to a call.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission method performed by a transmission device transmitting data to a certain communication device among a plurality of communication devices, the communication devices connected over a wireless network in wireless communication capable of using a plurality of transmission rates, where communication with a communication device that does not concern transmission and reception of the data is inhibited during a certain transmission inhibited period in the wireless communication, the transmission method comprising:

transmitting a first data packet at a basic rate and a first amount of data associated with the basic rate to the certain communication device during the transmission inhibited period, wherein the basic rate is the lowest capacity transmission rate available;

receiving a first acknowledgement packet comprising communication environment information relating to transmission of the first data packet; and transmitting a second data packet at a new transmission rate and a second amount of data associated with the new transmission rate to the certain communication device, wherein the new transmission rate is higher than the basic transmission rate and is set based on the received communication environment information, and wherein the first amount of data of the first data packet Is less than the second amount of data of the second data packet such that the communication environment information is based on analysis of the smaller first amount of data to allow the larger second amount of data of the second data packet to be successfully transmitted at a higher throughput, wherein the second data packet has the higher throughput than the first data packet only if the analysis of the first data packet justifies the higher throughput.

2. The transmission method according to claim 1, wherein the basic rate is the basic rate as defined in at least one of Institute of Electrical and Electronic Engineers 802.11 and Institute of Electrical and Electronic Engineers 802.11n.

3. A non-transitory computer-readable medium comprising instructions for causing a computer to perform a transmission process in a transmission device transmitting data to a certain communication device among a plurality of communication devices, the communication devices connected over a wireless network in wireless communication capable of using a plurality of transmission rates, where communication with a communication device that does not concern transmission and reception of the data is inhibited during a certain transmission inhibited period in the wireless communication, the instructions comprising:

transmitting a first data packet at a basic rate and a first amount of data associated with the basic rate to the certain communication device during the transmission inhibited period, wherein the basic rate is the lowest capacity transmission rate available;

receiving a first acknowledgement packet comprising communication environment information relating to transmission of the first data packet; and transmitting a second data packet at a new transmission rate and a second amount of data associated with the new transmission rate to the certain communication device, wherein the new transmission rate is higher than the basic transmission rate and is set based on the received communication environment information, and wherein the first amount of data of the first data packet Is less than the second amount of data of the second data packet such that the communication environment information is based on analysis of the smaller first amount of data to allow the larger second amount of data of the second data packet to be successfully transmitted at a higher throughput, wherein the second data packet has the higher throughput than the first data packet only if the analysis of the first data packet justifies the higher throughput.

4. The non-transitory computer-readable medium according to claim 3, wherein the basic rate is the basic rate as defined in at least one of Institute of Electrical and Electronic Engineers 802.11 and Institute of Electrical and Electronic Engineers 802.11n.

5. A transmission device transmitting data to a certain communication device among a plurality of communication devices, the communication devices connected over a wireless network in wireless communication capable of using a plurality of transmission rates, where communication with a communication device that does not concern transmission and reception of the data is inhibited during a certain transmission inhibited period in the wireless communication, the transmission device comprising:

a first transmitting unit transmitting a first data packet at a basic rate and a first amount of data associated with the basic rate to the certain communication device during the transmission inhibited period, wherein the basic rate is the lowest capacity transmission rate available;

a receiving unit receiving a first acknowledgement packet comprising communication environment information relating to transmission of the first data packet; and a second transmitting unit transmitting a second data packet at a new transmission rate and a second amount of data associated with the new transmission rate to the certain communication device, wherein the new transmission rate is higher than the basic transmission rate and is set based on the received communication environment information, and wherein the first amount of data of the first data packet Is less than the second amount of data of the second data packet such that the communication environment information is based on analysis of the smaller first amount of data to allow the larger second amount of data of the second data packet to be successfully transmitted at a higher throughput, wherein the second data packet has the higher throughput than the first data packet only if the analysis of the first data packet justifies the higher throughput.

6. The transmission device according to claim 5, wherein the wireless communication conforms to Institute of Electrical and Electronic Engineers 802.11.

7. The transmission device according to claim 5, wherein the transmission inhibited period is the period of a Network Allocation Vector defined in Institute of Electrical and Electronic Engineers 802.11 or the period of a LongNAV defined in Institute of Electrical and Electronic Engineers 802.11n.

8. The transmission device according to claim 5, wherein the basic rate is the basic rate as defined in at least one of Institute of Electrical and Electronic Engineers 802.11 and Institute of Electrical and Electronic Engineers 802.11n.

* * * * *